L. W. HORNE.
BRAKE OPERATING MECHANISM.
APPLICATION FILED JAN. 5, 1916.
1,261,934.
Patented Apr. 9, 1918.
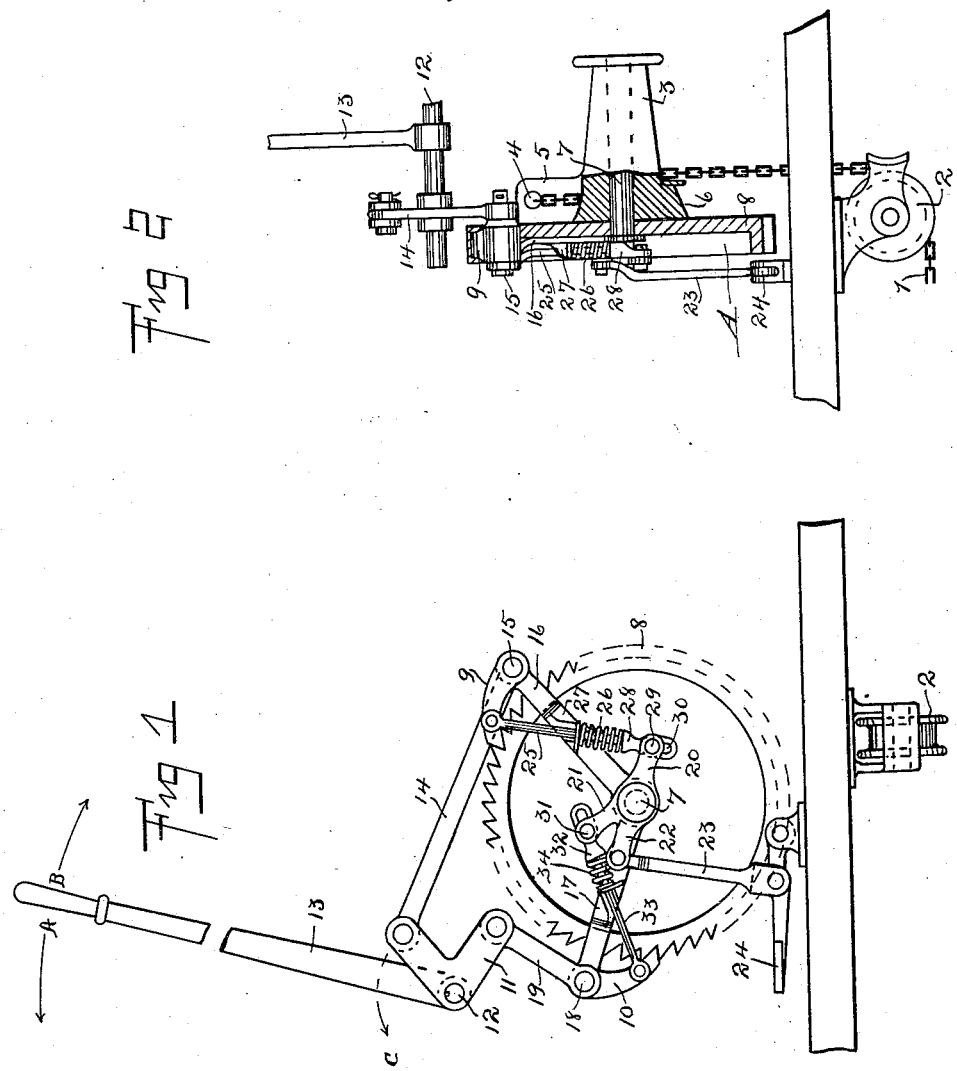
INVENTOR
L. W. Horne
BY
ATTORNEY

UNITED STATES PATENT OFFICE.

LAWRENCE WESLEY HORNE, OF NEW YORK, N. Y., ASSIGNOR TO LORD MANUFACTURING CO., OF NEW YORK, N. Y., A CORPORATION OF NEW YORK.

BRAKE-OPERATING MECHANISM.

1,261,934.   Specification of Letters Patent.   Patented Apr. 9, 1918.

Application filed January 5, 1916. Serial No. 70,381.

*To all whom it may concern:*

Be it known that I, LAWRENCE WESLEY HORNE, a citizen of the United States, and resident of the town of Bayside, county of Queens, city and State of New York, have invented certain new and useful Improvements in Brake-Operating Mechanism, of which the following is a specification.

The object of this invention is to produce a brake that will operate more rapidly than the ordinary hand brake and yet one that will be quite as efficient and that will require less space for its operative mechanism.

This brake may be arranged low down and in a space not utilized by other mechanisms and the portion that projects upward is so small that it will not be met by the body of the motorman nor will it limit the platform room which is then free to be utilized by passengers or others.

The brake being of the double acting type and having a peculiarly designed drum will be found more rapid in its operation than the ordinary wheel operated brakes. This and other features will be developed as the specification progresses.

The following is what I consider the best means of carrying out this invention and The accompanying drawings form a part of this specification, in which—

Figure 1 shows a front elevation of a brake with the casing removed.

Fig. 2 is a side elevation partly in section of the device shown in Fig. 1.

Similar reference numerals indicate like parts in all the figures where they appear.

At 1 I show an ordinary brake chain. This chain may have one end connected to a brake gear by any ordinary means, the other end of the chain is passed over the wheel 2 and is then received upon a drum 3, the extreme end being secured to the eye 4 formed in a lug 5 which lugs is in turn formed integral with the drum 3. The drum 3, is tapered and is also provided with an enlarged portion 6, which rapidly takes up the slack in the chain as the chain is wound upon the tapered drum and from the larger to the smaller end thereof the power applied to the chain will be increased due to the fact that the reduced diameter will take up the chain more slowly.

The drum 3 is mounted upon a shaft 7 and is operated by means of a gear 8 the only gear in my device. This gear 8 is really a ratchet and is rotated by means of a plurality of dogs 9 and 10 and the mechanisms connected therewith.

Spaced a convenient distance from the gear 8 I arrange an angular lever 11 which is secured to and operable with a shaft 12 upon which is also secured the operating handle 13. To one end of the angular lever 11 I pivot an arm 14 the free end of which terminates upon a pivot 15 upon which the dog 9 is also supported. A second lever 16 extends to and is free to rotate upon the shaft 7.

Upon the shaft 7 and rotatable thereon I arrange another lever 17 which extends outwardly at an angle to the lever 16 and which terminates in a rotatable connection with the pivot 18 upon which the dog 10 is free to move. A short lever 19 is also pivotally mounted upon the pin 18 and is rotatably engaged with another arm of the lever 11, and it will be noted that the connections of both of the rods or bars 14 and 19 are upon the same side of the shaft 12 to which the angular lever 11 is secured.

I provide a simple means for disengaging the dogs 9 and 10 from the ratchet wheel 8, this means consists of a casting loosely secured upon the shaft 7 and having three projections 20, 21, and 22. Into the projection 22 I pivotally secure a bar 23 which terminates in a foot operated lever 24. To the projection 20 I pivotally connect a rod 25, the upper end of which is loosely or pivotally connected to the dog 9. Upon this rod 25 I arrange a spring 26, one end of which impinges upon a projection 27 which may be a block or lug formed integral with the bar or lever 16. This spring 26 also impinges upon a casting 28, which may receive the lower end of the rod 25 and it urges this casting and the rod 25 downward so as to retain the dog 9 in engagement with the ratchet wheel 8. The pivot 29 in the projection 20 is received in a slot 30 in a casting 28, which slot is provided to allow the dog 9 to ratchet across the teeth of the ratchet wheel 8 during a reverse motion of the dog 9.

Into the projection 21 I secure a pivot 31 which receives a slotted casting 32, which is in turn engaged upon the end of the rod 33. The rod 33 is pivoted to the dog 10 and a spring 34 operating in a manner exactly similar to the spring 26 retains the dog 10 in engagement with the ratchet wheel 8.

It will be noted that the ratchet wheel is cupped as shown at A and that the layers and rods arranged upon or closely adjacent to the shaft 7 are bent so that they will occupy the space provided by the cupping of the ratchet wheel 8.

In operating my device the handle or lever 13 is moved backward and forward as indicated by the arrows A and B. A movement in the direction of the arrow A will partially rotate the angular lever 11 and will move it in the direction of the arrow C. This will cause the dog 9 to partially rotate the ratchet wheel 8 and the drum 3. The same movement of the handle lever 13 will draw upward the rod or lever 19 and the parts operated thereby, causing the dog 10 to ratchet across the teeth 8.

A reverse movement of the handle lever 13 or a movement in the direction of the arrow B will cause the dog 9 to disengage and ratchet across the teeth of the gear 8 and will also cause the dog 10 to engage with the teeth of and move the ratchet wheel 8. It will be seen then that each movement of the handle lever 13 or a movement in either direction will be accompanied by an effective rotation of the ratchet wheel 9 and drum 3. To release the ratchet wheel and to free the brake chain it is only necessary to depress the foot lever 24, this will disengage both dogs and will allow the drum and ratchet wheel to rotate backward, in a direction to free the chain.

Although I have shown my device as constructed for use upon the platform of a car I know of no reason why it could not be placed in any convenient position, and it is obvious that the sizes of all parts may be changed at will.

It will of course be understood that I provide a casing for the support of the drum and ratchet wheel and that the shaft 12 should also be supported by the casing or by some other convenient means.

Modifications may be made within the scope of the appended claims without departing from the principle or sacrificing the advantage of this invention.

Having carefully and fully described my invention what I claim and desire to secure by Letters Patent is:—

1. A brake having a drum, a ratchet wheel secured thereto, a plurality of ratchets operable on said wheel and means for operating them in combination with a member rotatable upon the shaft of said wheel and having a plurality of projections and a resilient connection between said projections and said ratchets, and a foot lever connected to another said projection and operable with said resilient member for tripping said ratchets simultaneously.

2. A device of the character described comprising a ratchet wheel having a chain drum formed integral therewith, and a shaft upon which said wheel and drum are rotatably mounted, a plurality of movable levers upon said shaft, a plurality of dogs upon said ratchet wheel and connected to said lever, a second shaft having a bell crank with each said dog in combination with a member rotatable upon said first mentioned shaft and having a plurality of projections and a rod connecting certain of said projections with said dogs and a foot lever connected to another said projection and adapted to release said dogs as herein specified.

3. A brake operating mechanism having an oscillating operating handle, a plurality of dogs moved by said operating handle, a shaft, a ratchet wheel and drum upon said shaft and rotated by the movement of said dogs, a normally stationary member upon said shaft and having a plurality of projections, rods pivoted to each said dog and to certain of said projections and a lever connected to said normally stationary member for moving said member to release said dogs.

4. A brake operating mechanism comprising means for winding a chain, a ratcheting means for rotating said chain winding means, an oscillating means remote from said ratcheting means for operating said ratcheting means, a bell crank lever connected to said oscillating means and to said ratcheting means and a normally stationary means supported by said chain winding means and connected to said ratcheting means and means for moving said normally stationary means for releasing said ratcheting means all arranged for the purpose set forth.

Signed at New York city, in the county and State of New York this 15th day of Dec., 1915.

LAWRENCE WESLEY HORNE.

Witnesses:
 G. E. S. MARR,
 ARTHUR PHELPHS MARR.